US010218407B2

(12) United States Patent
Trotta et al.

(10) Patent No.: US 10,218,407 B2
(45) Date of Patent: Feb. 26, 2019

(54) RADIO FREQUENCY SYSTEM AND METHOD FOR WEARABLE DEVICE

(71) Applicant: Infineon Technologies AG, Neubiberg (DE)

(72) Inventors: Saverio Trotta, Munich (DE); Ashutosh Baheti, Munich (DE); Reinhard-Wolfgang Jungmaier, Aying (DE); Jagjit Singh Bal, Fremont, CA (US)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 15/231,544

(22) Filed: Aug. 8, 2016

(65) Prior Publication Data

US 2018/0041241 A1 Feb. 8, 2018

(51) Int. Cl.
*G01S 7/41* (2006.01)
*H04B 1/44* (2006.01)
(Continued)

(52) U.S. Cl.
CPC ................ *H04B 1/44* (2013.01); *G01S 13/88* (2013.01); *G06F 1/163* (2013.01); *G06F 1/169* (2013.01);
(Continued)

(58) Field of Classification Search
None
See application file for complete search history.

(56) References Cited

U.S. PATENT DOCUMENTS 4,241,347 A 12/1980 Albanese et al.
6,147,572 A 11/2000 Kaminski et al.
(Continued)

FOREIGN PATENT DOCUMENTS

CN 1463161 A 12/2003
CN 1716695 A 1/2006
(Continued)

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

(Continued)

*Primary Examiner* — David Bilodeau
(74) *Attorney, Agent, or Firm* — Slater Matsil, LLP

(57) ABSTRACT

A radio frequency (RF) system includes an RF integrated circuit (IC) die. The RF IC die includes a first transmit circuit, a second transmit circuit, a first receive circuit, a second receive circuit, and a control circuit coupled to the first transmit circuit, the second transmit circuit, the first receive circuit, and the second receive circuit. The RF system further includes a first antenna coupled to the first transmit circuit and the first receive circuit using a first coupling structure. The control circuit is configured to activate the first transmit circuit and deactivate the first receive circuit during a first operation mode. The RF system further includes a second antenna coupled to the second transmit circuit and the second receive circuit using a second coupling structure. The control circuit is configured to activate the second transmit circuit and deactivate the second receive circuit during a second operation mode.

29 Claims, 8 Drawing Sheets

(51) Int. Cl.

| | |
|---|---|
| ***G06F 3/01*** | (2006.01) |
| ***H01Q 21/00*** | (2006.01) |
| ***H04B 1/3827*** | (2015.01) |
| ***G01S 13/88*** | (2006.01) |
| ***G06F 1/16*** | (2006.01) |
| ***H01Q 21/06*** | (2006.01) |
| ***G06F 3/0346*** | (2013.01) |
| *H01Q 1/27* | (2006.01) |
| *G01S 13/93* | (2006.01) |
| *H01Q 3/24* | (2006.01) |
| *H01Q 3/26* | (2006.01) |

(52) U.S. Cl.

CPC ............ *G06F 3/017* (2013.01); *G06F 3/0346* (2013.01); *H01Q 21/00* (2013.01); *H01Q 21/065* (2013.01); *H04B 1/385* (2013.01); *G01S 7/415* (2013.01); *G01S 13/931* (2013.01); *H01Q 1/273* (2013.01); *H01Q 3/24* (2013.01); *H01Q 3/26* (2013.01); *H04B 2001/3861* (2013.01)

(56) References Cited

U.S. PATENT DOCUMENTS 6,414,631 B1 7/2002 Fujimoto
6,636,174 B2 10/2003 Arikan et al.
7,048,973 B2 5/2006 Sakamoto et al.
7,057,564 B2 6/2006 Tsai et al.
7,171,052 B2 1/2007 Park
7,317,417 B2 1/2008 Arikan et al.
7,596,241 B2 9/2009 Rittscher et al.
7,692,574 B2 4/2010 Nakagawa
7,873,326 B2 1/2011 Sadr
7,889,147 B2 2/2011 Tam et al.
8,228,382 B2 7/2012 Pattikonda
8,497,805 B2 7/2013 Rofougaran et al.
8,659,369 B2 2/2014 Rofougaran et al.
8,731,502 B2 5/2014 Salle et al.
8,836,596 B2 9/2014 Richards et al.
8,847,814 B2 9/2014 Himmelstoss et al.
8,860,532 B2 10/2014 Gong et al.
8,976,061 B2 3/2015 Chowdhury
9,172,132 B2 10/2015 Kam et al.
9,202,105 B1 12/2015 Wang et al.
9,413,079 B2 8/2016 Kamgaing et al.
9,495,600 B2 11/2016 Heu et al.
2003/0179127 A1 9/2003 Wienand
2004/0238857 A1 12/2004 Beroz et al.
2006/0001572 A1 1/2006 Gaucher et al.
2006/0049995 A1 3/2006 Imaoka et al.
2006/0067456 A1 3/2006 Ku et al.
2007/0210959 A1 9/2007 Herd et al.
2008/0106460 A1 5/2008 Kurtz et al.
2008/0238759 A1 10/2008 Carocari et al.
2008/0291115 A1 11/2008 Doan et al.
2008/0308917 A1 12/2008 Pressel et al.
2009/0073026 A1 3/2009 Nakagawa
2009/0085815 A1 4/2009 Jakab et al.
2009/0153428 A1 6/2009 Rofougaran et al.
2009/0315761 A1 12/2009 Walter et al.
2010/0207805 A1 8/2010 Haworth
2011/0299433 A1* 12/2011 Darabi .................. H04B 1/525 370/277
2012/0087230 A1 4/2012 Guo et al.
2012/0092284 A1 4/2012 Rofougaran et al.
2012/0116231 A1 5/2012 Liao et al.
2012/0195161 A1 8/2012 Little et al.
2012/0206339 A1* 8/2012 Dahl ...................... G06F 3/043 345/156
2012/0280900 A1 11/2012 Wang et al.
2013/0027240 A1 1/2013 Chowdhury
2013/0106673 A1 5/2013 McCormack et al.
2014/0028542 A1 1/2014 Lovitt et al.
2014/0070994 A1 3/2014 Schmalenberg et al.
2014/0145883 A1 5/2014 Baks et al.
2014/0324888 A1 10/2014 Xie et al.
2015/0084194 A1* 3/2015 Molzer ................ H01L 23/481 257/741
2015/0181840 A1 7/2015 Tupin, Jr. et al.
2015/0185316 A1 7/2015 Rao et al.
2015/0212198 A1 7/2015 Nishio et al.
2015/0243575 A1 8/2015 Strothmann et al.
2015/0277569 A1 10/2015 Sprenger et al.
2015/0325925 A1 11/2015 Kamgaing et al.
2015/0346820 A1 12/2015 Poupyrev et al.
2015/0348821 A1 12/2015 Iwanaga et al.
2015/0364816 A1 12/2015 Murugan et al.
2016/0018511 A1 1/2016 Nayyar et al.
2016/0041617 A1 2/2016 Poupyrev
2016/0041618 A1 2/2016 Poupyrev
2016/0061942 A1 3/2016 Rao et al.
2016/0061947 A1 3/2016 Patole et al.
2016/0098089 A1* 4/2016 Poupyrev ............... G01S 13/04 345/156
2016/0103213 A1 4/2016 Ikram et al.
2016/0109566 A1 4/2016 Liu et al.
2016/0118353 A1 4/2016 Ahrens et al.
2016/0146931 A1 5/2016 Rao et al.
2016/0146933 A1 5/2016 Rao et al.
2016/0187462 A1 6/2016 Altus et al.
2016/0191232 A1 6/2016 Subburaj et al.
2016/0240907 A1 8/2016 Haroun
2016/0249133 A1 8/2016 Sorensen
2016/0252607 A1* 9/2016 Saboo .................... G01S 13/02 342/107
2016/0259037 A1* 9/2016 Molchanov ............ G06F 3/011
2016/0266233 A1 9/2016 Mansour
2016/0269815 A1 9/2016 Liao et al.
2016/0291130 A1 10/2016 Ginsburg et al.
2016/0299215 A1 10/2016 Dandu et al.
2016/0306034 A1 10/2016 Trotta et al.
2016/0320852 A1* 11/2016 Poupyrev ............. G06F 3/0325
2016/0320853 A1 11/2016 Lien et al.
2016/0327633 A1 11/2016 Kumar Y.B. et al.
2016/0334502 A1 11/2016 Ali et al.
2016/0349845 A1 12/2016 Poupyrev et al.
2017/0033062 A1 2/2017 Liu et al.
2017/0045607 A1 2/2017 Bharadwaj et al.
2017/0052618 A1 2/2017 Lee et al.
2017/0054449 A1 2/2017 Mani et al.
2017/0060254 A1 3/2017 Molchanov et al.
2017/0070952 A1 3/2017 Balakrishnan et al.
2017/0074974 A1 3/2017 Rao et al.
2017/0074980 A1* 3/2017 Adib ......................... G01S 7/35
2017/0090014 A1 3/2017 Subburaj et al.
2017/0090015 A1 3/2017 Breen et al.
2017/0115377 A1 4/2017 Giannini et al.
2017/0131395 A1* 5/2017 Reynolds ................ G01S 13/56
2017/0139036 A1 5/2017 Nayyar et al.
2017/0170947 A1* 6/2017 Yang ...................... H04B 1/401
2017/0176574 A1 6/2017 Eswaran et al.
2017/0192847 A1 7/2017 Rao et al.
2017/0201019 A1 7/2017 Trotta
2017/0212597 A1 7/2017 Mishra
2017/0364160 A1 12/2017 Malysa et al.
2018/0046255 A1 2/2018 Rothera et al.
2018/0101239 A1 4/2018 Yin et al.

FOREIGN PATENT DOCUMENTS

CN 101490578 A 7/2009
CN 101585361 A 11/2009
CN 102788969 A 11/2012
CN 102967854 A 3/2013
CN 103529444 A 1/2014
CN 203950036 U 11/2014
DE 102008054570 A1 6/2010
DE 102011075725 A1 11/2012
DE 102014118063 A1 7/2015
GB 2247799 A 3/1992
JP 2001174539 A 6/2001
JP 2004198312 A 7/2004

(56) References Cited

FOREIGN PATENT DOCUMENTS

| | | | |
|---|---|---|---|
| JP | 2006234513 | A | 9/2006 |
| JP | 2008029025 | A | 2/2008 |
| JP | 2008089614 | A | 4/2008 |
| JP | 2009069124 | A | 4/2009 |
| JP | 2011529181 | A | 12/2011 |
| JP | 2012112861 | A | 6/2012 |
| JP | 2013521508 | A | 6/2013 |
| JP | 2014055957 | A | 3/2014 |
| KR | 20090063166 | A | 6/2009 |
| KR | 20140082815 | A | 7/2014 |
| WO | 2007060069 | A1 | 5/2007 |
| WO | 2013009473 | A2 | 1/2013 |
| WO | 2016033361 | A1 | 3/2016 |

OTHER PUBLICATIONS

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://iap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Mailers, "Single-Chip 24 GHz Radar Front End," Infineon Technologies AG, www.microwavejournal.com/articles/print/21553-single-chip-24-ghz-radar-front-end, Feb. 13, 2014, 2 pages.

Simon, W., et al., "Highly Integrated KA-Band Tx Frontend Module Including 8×8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

Thayananthan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

* cited by examiner

RADIO FREQUENCY SYSTEM AND METHOD FOR WEARABLE DEVICE

TECHNICAL FIELD

The present disclosure relates generally to an electronic device, and more particularly to a radio frequency (RF) system with an RF integrated circuit (RFIC) and an antenna system to be utilized in a wearable device.

BACKGROUND

Applications in the millimeter-wave frequency regime have gained significant interest in the past few years due to the rapid advancement in low cost semiconductor technologies such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for mm-wave applications at 60 GHz, 77 GHz, and 80 GHz, and also beyond 100 GHz. Such applications include, for example, automotive radar systems, multi-gigabit communication systems, and wearable consumer devices such as smart watches, activity monitors and health monitors.

In some radar systems, the distance between the radar and a target is determined by transmitting a frequency modulated signal, receiving a reflection of the frequency modulated signal, and determining a distance based on a time delay and/or frequency difference between the transmission and reception of the frequency modulated signal. Accordingly, some radar systems include a transmit antenna to transmit the RF signal, a receive antenna to receive the RF, as well as the associated RF circuitry used to generate the transmitted signal and to receive the RF signal. In some cases, multiple antennas may be used to implement directional beams using phased array techniques.

SUMMARY

According to an embodiment, a radio frequency (RF) system includes an RF integrated circuit (IC) die. The RF IC die includes a first transmit circuit, a second transmit circuit, a first receive circuit, a second receive circuit, and a control circuit coupled to the first transmit circuit, the second transmit circuit, the first receive circuit, and the second receive circuit. The RF system further includes a first antenna coupled to the first transmit circuit and the first receive circuit using a first coupling structure. The control circuit is configured to activate the first transmit circuit and deactivate the first receive circuit during a first operation mode. The RF system further includes a second antenna coupled to the second transmit circuit and the second receive circuit using a second coupling structure. The control circuit is configured to activate the second transmit circuit and deactivate the second receive circuit during a second operation mode.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
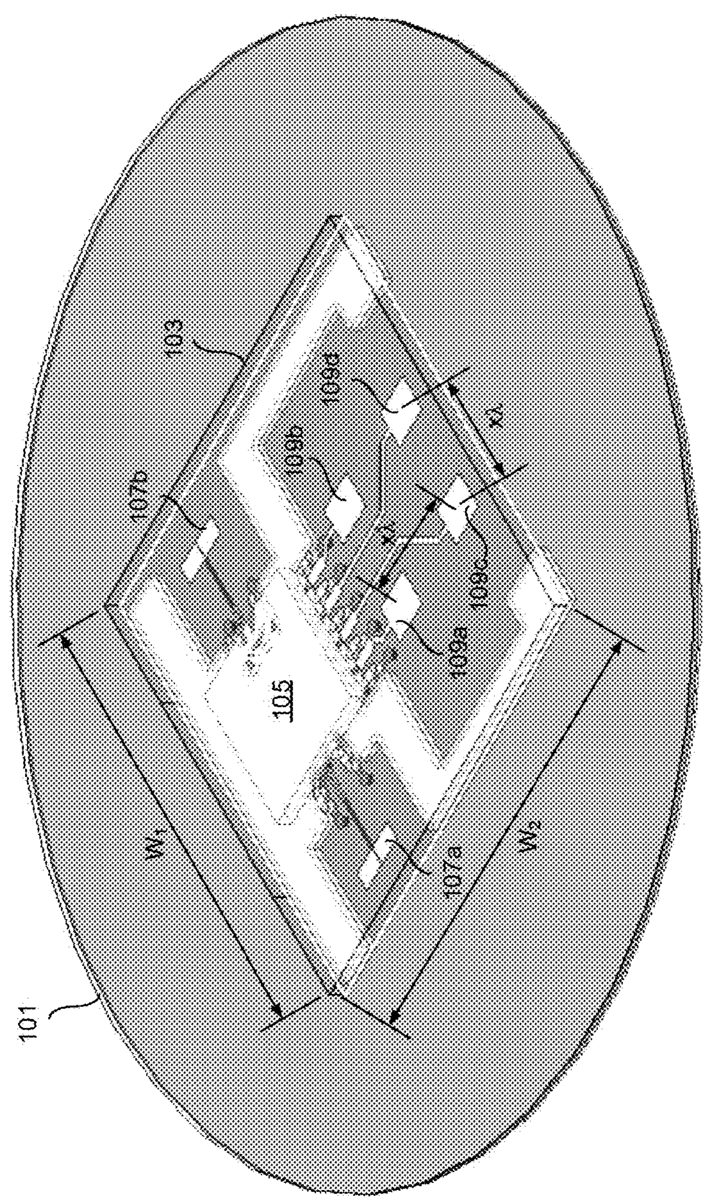
FIG. 1 illustrates a perspective view of a typical RF circuit/antenna package mounted on a circuit board.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present disclosure will be described with respect to embodiments in a specific context, a radio frequency (RF) system including an RF integrated circuit (RFIC) and an antenna system. In particular, various embodiments below will be described with respect to an RF system that is a part of a gesture sensing system of a wearable consumer device such as, for example, a smart watch. Various embodiments presented herein may also be applied to other systems and applications, such as other wearable/portable consumer devices (such as health monitoring systems, activity monitoring systems, mobile phones, tablet devices, portable gaming consoles, photo cameras, video camcorders, laptop computers, notebook computers, or the like) and non-portable consumer devices (TV sets, gaming consoles, desktop computers, or the like).

In various embodiments presented herein, an RF system is provided, which may be integrated into a gesture sensing system of a wearable device. In various embodiments, the gesture sensing system may be implemented using mm-wave RF circuits to produce a mm-wave gesture sensing system. In an embodiment, the gesture sensing system includes an RF system, including RF circuitry and antennas, which is implemented in a ball grid array (BGA) package. Such an RF circuitry/antenna package includes an integrated circuit having a receive interface on a first edge of chip and transmit interfaces on adjacent or opposite edges of the chip. A multi-element patch antenna is disposed on a surface of the package adjacent to the first edge of the chip, and is coupled to multiple receive channel interfaces at the first edge of the chip. Similarly, patch antennas for transmitting signals are disposed in the redistribution layer of the package on the adjacent or opposite edges of the chip adjacent to the transmit interfaces.

In some embodiments, an RF circuitry/antenna package includes a plurality antennas, where each of the antennas is configured to act as a receive antenna or a transmit antenna depending on a mode of operation. Each of the antennas is coupled to corresponding receive and transmit circuits using a coupling structure. The coupling structure may be a passive structure, such as a rat-race coupler, a Wilkinson power divider, a circulator, or the like, or a switch. The coupling structure may be formed on a substrate of the integrated circuit chip of the RF circuitry/antenna package, or in a redistribution layer in the fan-out area of the RF circuitry/antenna package. By using the same antenna as a receive antenna and a transmit antenna, the total number of antennas within the RF circuitry/antenna package may be reduced. Accordingly, a size of the RF circuitry/antenna package may be reduced. Such a size reduction may be beneficial for integrating the RF circuitry/antenna package in devices that have reduced sizes, such as wearable devices, for example.

In some embodiments, a method of operating the RF circuitry/antenna package includes switching between a first mode of operation and a second mode of operation in an alternating manner. During the first mode of operation, a first antenna of the RF circuitry/antenna package transmits RF signals, while a second antenna of the RF circuitry/antenna package receives RF signals. During the second mode of operation, the second antenna of the RF circuitry/antenna package transmits RF signals, while the first antenna of the RF circuitry/antenna package receives RF signals.

In some embodiments, beam forming concepts, which are widely used in radar systems, may be used to impart beam steering and directionality to the transmission and reception of RF signals. Such embodiments may be applied, for example, to automotive radar systems, camera systems, portable systems, wearable systems, TV sets, tablet computers, and other applications. Embodiment beam forming concepts may also be used to implement a gesture recognition system. In the past, gesture recognition systems have been implemented using optical cameras, pressure sensors, PALs and other devices. By using embodiment radar systems, a gesture recognition system may perform accurate distance measurements, while being conveniently hidden behind an opaque cover made of plastic or other sturdy materials.

FIG. 1 illustrates a perspective view of a typical RF circuitry/antenna package 103 mounted on a circuit board 101. The RF circuitry/antenna package 103 is mounted on the circuit board 101 using solder balls (not shown). The circuit board 101 may be implemented using an insulating substrate having one or more thin conductive layers (not individually shown) laminated on one or both sides of the insulating substrate. The one or more thin conductive layers are patterned (for example, etched) to form circuitry interconnections of the circuit board 101. The one or more thin conductive layers may be configured as ground, power and/or signal layers. The insulating substrate is formed of FR4 and the one or more thin conductive layers are formed of copper. Alternatively, other insulating materials, such as Rogers PCB material, or conductive materials may be used to form the circuit board 101. The circuit board 101 may include additional conductive and insulating layers as known in the art.

The RF circuitry/antenna package 103 includes an RF front-end integrated circuit (IC) die 105, transmit antennas 107*a* and 107*b*, and receive antennas 109*a*-109*d*. The RF circuitry/antenna package 103 is configured to transmit an incident RF signal toward an object (such as, for example, a hand of a consumer when the RF circuitry/antenna package 103 is a part of a gesture sensing system of a wearable device) via transmit antennas 107*a* and 107*b*, and receive a reflected RF signal from the object via receive antennas 109*a*-109*d*. The RF front-end IC die 105 includes a receiver front end (not shown) coupled to the receive antennas 109*a*-109*d* and a transmitter front end (not shown) coupled to the transmit antennas 107*a* and 107*b*. The transmit antennas 107*a* and 107*b* and the receive antennas 109*a*-109*d* are implemented using patch antennas. Alternatively, other antenna types, such as Yagi-Uda antenna, a Vivaldi antenna, a bow-tie antenna, or the like, may be used to implement the transmit antennas 107*a* and 107*b* and the receive antennas 109*a*-109*d*. The RF front-end IC die 105 provides signals to be transmitted to the transmitter front end and receives and/or processes signals received by the receiver front end. In some embodiments, the frequency of operation of the RF circuitry/antenna package 103 is between about 57 GHz and about 66 GHz. Alternatively, embodiment systems may operate at frequencies outside of this range also.

The receive antennas 109*a*-109*d* that are arranged in a square configuration have centers that are spaced apart from each other by a distance equal to some multiple or fraction x of a wavelength $\lambda$ of the signal frequency being transmitted by the RF circuitry/antenna package 103. In some embodiments, x is between about ½ and about ⅔. Alternatively, x may be outside of this range. In alternative embodiments, greater or fewer than four patch antennas may be used to implement receive antennas depending on the specifications of the particular system.

As shown, the RF circuitry/antenna package 103 is an embedded wafer level (eWLB) ball grid array (BGA) package that includes a molding material layer. In such an embodiment, the RF front-end IC die 105 is disposed within the molding material layer. The RF circuitry/antenna package 103 may further include conductive layers, such as redistribution layers (RDLs), used for routing and/or for the implementation of various passive or active devices within the package. The transmit antennas 107*a* and 107*b*, and the receive antennas 109*a*-109*d* may be implemented using the RDLs. Alternatively, other package types such as a BGA package or advanced thin small leadless (ATSPL) package may also be used to implement the RF circuitry/antenna package 103. In an embodiment, a first width $W_1$ of the RF circuitry/antenna package 103 is between about 8 mm and about 9 mm, and a second width $W_2$ of the RF circuitry/antenna package 103 is between about 11 mm and about 12.5 mm. As described below in greater detail, the transmit antennas 107*a* and 107*b* are omitted that some of the receive antennas 109*a*-109*d* are configured to act as both receive and transmit antennas. By omitting the transmit antennas 107*a* and 107*b*, the first width $W_1$ of the RF circuitry/antenna package 103 may be further reduced.

Figure 2:
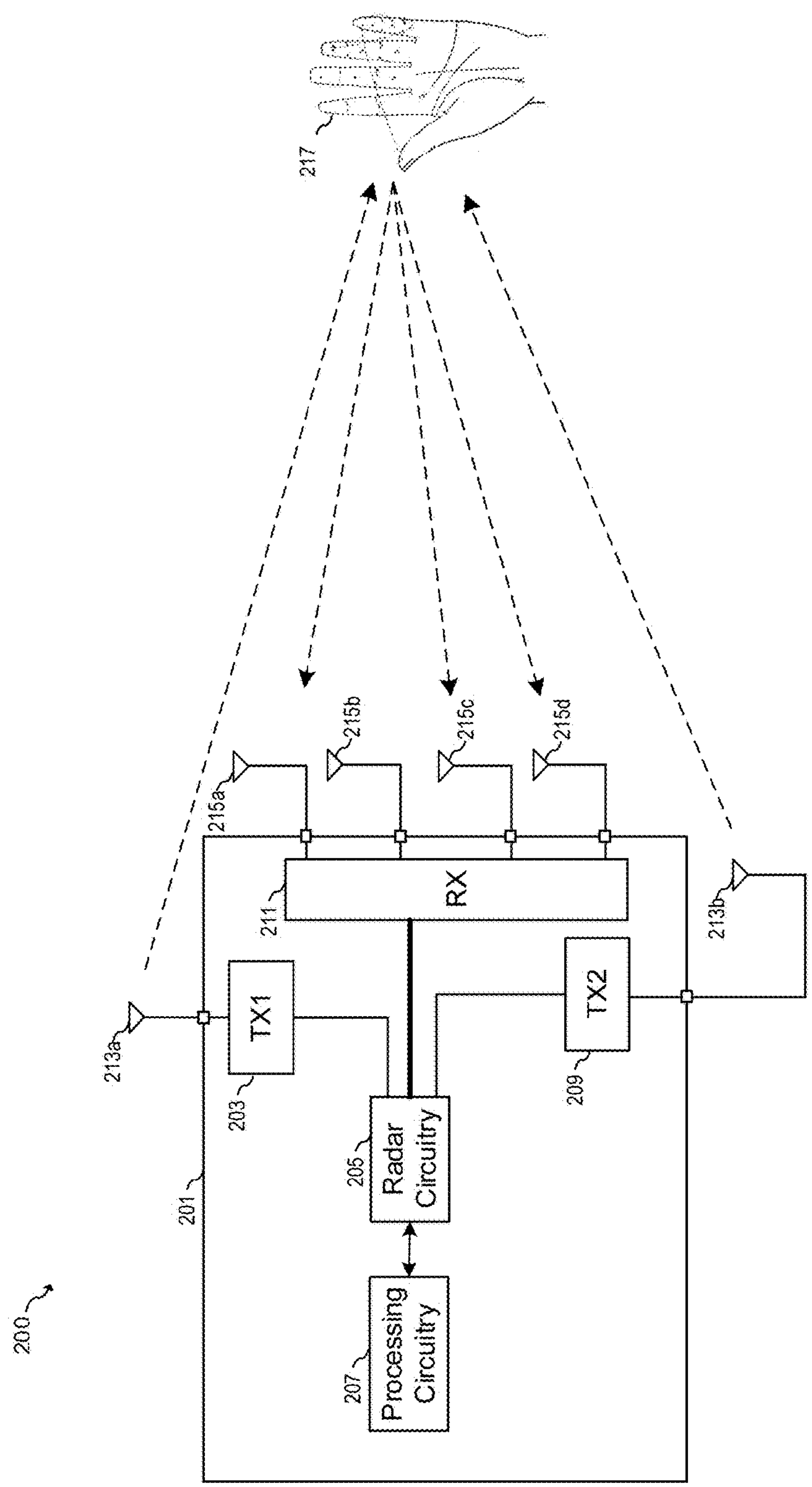
FIG. 2 illustrates a schematic diagram of a mm-wave gesture sensing system in accordance with some embodiments.

FIG. 2 illustrates a schematic diagram of a mm-wave gesture sensing system 200 in accordance with some embodiments. As shown, a radar transceiver device 201 is configured to transmit an incident RF signal toward a gesturing hand 217 via transmit antenna 213*a* and/or transmit antenna 213*b*, and receive a reflected RF signal via an antenna array that includes receive antennas 215*a*-215*d*. The radar transceiver device 201 includes a receiver front end 211 coupled to the receive antennas 215*a*-215*d*, a first transmitter front end 203 coupled to the transmit antenna 213*a* and a second transmitter front end 209 coupled to the transmit antenna 213*b*. Radar circuitry 205 provides signals to be transmitted to the first and second transmitter front ends 203 and 209, and receives signals via the receiver front end 211. Processing circuitry 207 processes the received signals, as well as controls the transmissions produced by the first transmitter front end 203 and the second transmitter front end 209. In some embodiments, the mm-wave gesture sensing system 200 is implemented as a frequency modulated continuous wave (FMCW) radar sensor having two transmit channels and four receive changes to realize a digital beam forming holographic radar such that a relative speed, distance, and phase of each target in the field of view (FOV) in front of the antennas is measured.

During operation, position and gestures of a gesturing hand 217 may be detected by the radar transceiver device 201 and/or other processing circuitry coupled thereto. For example, the radar transceiver device 201 may be coupled to a wearable device, a computer system, an appliance, or other devices, and the detected gestures may be used as an input to such devices. For example, a gesture of two fingers tapping each other could be interpreted as a "button press," or a gesture of a rotating thumb and finger may be interpreted as a turning a dial.

In some embodiments, the radar transceiver device 201, or portions of the radar transceiver device 201 may be implemented in a package (such as the RF circuitry/antenna package 103 described above with reference to FIG. 1) that contains radar circuitry 205, the first transmitter front end 203, the second transmitter front end 209, the receiver front end 211, as well as the transmit antennas 213*a* and 213*b*, and the receive antennas 215*a*-215*d*. In other embodiments, the radar transceiver device 201 may be implemented as one or more integrated circuits disposed on a circuit board, and the transmit antennas 213*a* and 213*b* and the receive antennas 215*a*-215*d* may be implemented on the circuit board adjacent to the integrated circuits. Various methods of operation of a gesture sensing system (such as the mm-wave gesture sensing system 200) have been described in U.S. application Ser. No. 14/954,198, filed on Nov. 30, 2015, which application is hereby incorporated herein by reference in its entirety.

Figure 3A:
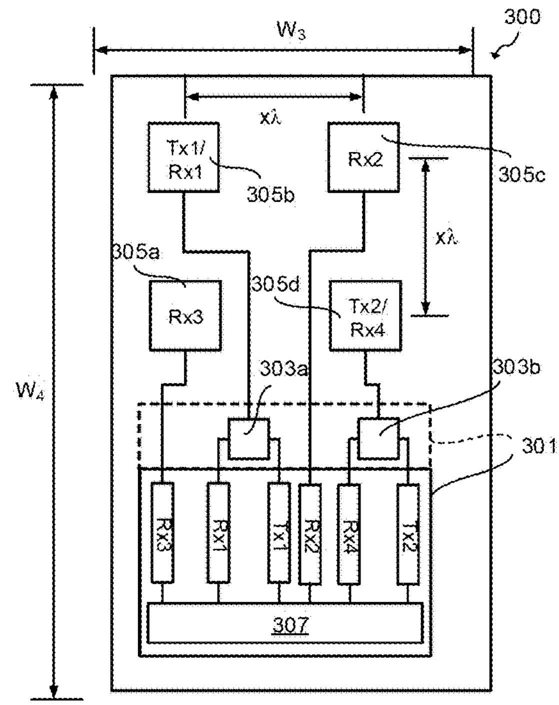
FIGS. 3A, 3B and 3C illustrate a schematic view of an RF circuit/antenna package in accordance with some embodiments.

FIG. 3A illustrates a schematic view of an RF circuitry/antenna package 300 in accordance with some embodiments. The RF circuitry/antenna package 300 includes an RF front-end IC die 301 having transmit circuits Tx1 and Tx2, and receive circuits Rx1, Rx2, Rx3 and Rx4. The RF circuitry/antenna package 300 further includes antennas 305*a*-305*d*. In some embodiments, the antennas 305*a*-305*d* may be similar to the receive antennas 109*a*-109*d* (see FIG. 1), and the description is not repeated herein for the sake of brevity. The antenna 305*a* is coupled to the receive circuit Rx3. The antenna 305*b* is coupled to the receive circuit Rx1 and the transmit circuit Tx1 using a coupling structure 303*a*. The antenna 305*c* is coupled to the receive circuit Rx2. The antenna 305*d* is coupled to the receive circuit Rx4 and the transmit circuit Tx2 using a coupling structure 303*b*. The coupling structures 303*a* and 303*b* may be implemented using a passive structure, such as a rat-race coupler, a Wilkinson power divider, a circulator, or the like, or a switch. In an embodiment, the coupling structures 303*a* and 303*b* may be formed on a substrate of the RF front-end IC die 301 of the RF circuitry/antenna package 300. In another embodiment, the coupling structures 303*a* and 303*b* may be formed in a redistribution layer in the fan-out area of the RF circuitry/antenna package 300. The RF front-end IC die 301 further includes a control circuit 307 coupled to the transmit circuits Tx1 and Tx2, and the receive circuits Rx1, Rx2, Rx3 and Rx4. The control circuit 307 is configured to activate or deactivate the transmit circuits Tx1 and Tx2, and the receive circuits Rx1, Rx2, Rx3 and Rx4. In an embodiment, the control circuit 307 includes one or more switches, for example. Alternatively, other suitable circuits may be used to implement the control circuit 307.

Referring further to FIG. 3A, the RF circuitry/antenna package 300 includes fewer antennas compared to the RF circuitry/antenna package 103 (see FIG. 1). In an embodiment, the RF circuitry/antenna package 300 does not include dedicated transmit antennas such as the transmit antennas 107*a* and 107*b* of the RF circuitry/antenna package 103. Accordingly, a first width $W_3$ of the RF circuitry/antenna package 300 may be less than the first width $W_1$ of the RF circuitry/antenna package 103. A difference between the first width $W_1$ and the first width $W_3$ may be between about 2 mm and about 4 mm, and a second width $W_4$ of the RF circuitry/antenna package 300 may be equal to the second width $W_2$ of the RF circuitry/antenna package 103. Alternatively, the second width $W_4$ of the RF circuitry/antenna package 300 may be different from the second width $W_2$ of the RF circuitry/antenna package 103.

Figure 3B:
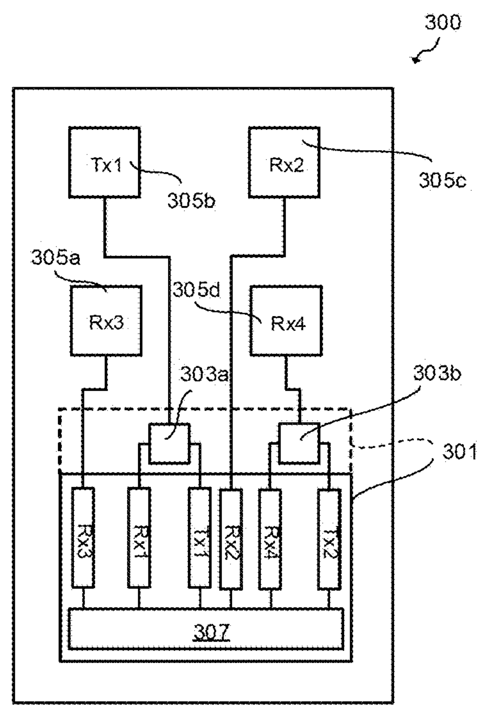

During operation of the RF circuitry/antenna package 300, the transmit circuits Tx1 and Tx2 are activated in an alternating manner, such that the transmit circuits Tx1 and Tx2 are not active at the same time. Referring to FIG. 3B, during a first mode of operation (also referred to as "Chirp 1"), the control circuit 307 activates the transmit circuit Tx1 and the receive circuit Rx4, while deactivates the receive circuit Rx1 and the transmit circuit Tx2. Accordingly, the antenna 305*b* acts as a transmit antenna and the antenna 305*d* acts as a receive antenna. Furthermore, the control circuit 307 also activates the receive circuits Rx2 and Rx3 and the antennas 305*a* and 305*c* act as receive antennas. In an embodiment, the antenna 305*b* transmits an RF signal toward an object (such as, for example, the gesturing hand 217 illustrated in FIG. 2, when the RF circuitry/antenna package 300 is used as a radar system for a gesture sensing system of a wearable device) and the antennas 305*a*, 305*c* and 305*d* receive a reflected RF signal from the object.

Figure 3C:
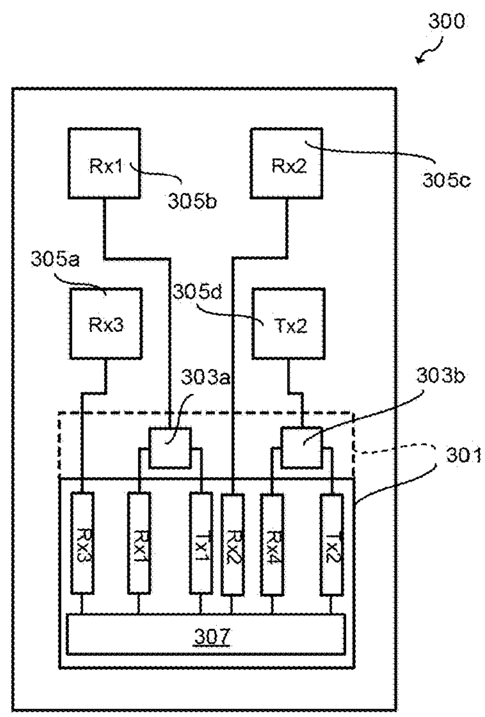

Referring to FIG. 3C, during a second mode of operation (also referred to as "Chirp 2"), the control circuit 307 activates the transmit circuit Tx2 and the receive circuit Rx1, while deactivates the receive circuit Rx4 and the transmit circuit Tx1. Accordingly, the antenna 305*b* acts as a receive antenna and the antenna 305*d* acts as a transmit antenna. Furthermore, the control circuit 307 also activates the receive circuits Rx2 and Rx3 and the antennas 305*a* and 305*c* act as receive antennas. In an embodiment, the antenna 305*d* transmits an RF signal toward the object and the antennas 305*a*, 305*b* and 305*c* receive a reflected RF signal from the object. In an embodiment, Chirp 1 and Chirp 2 are repeated N times in an alternating manner. The value of N may vary according to design requirements of the RF circuitry/antenna package 300.

Figure 4A:
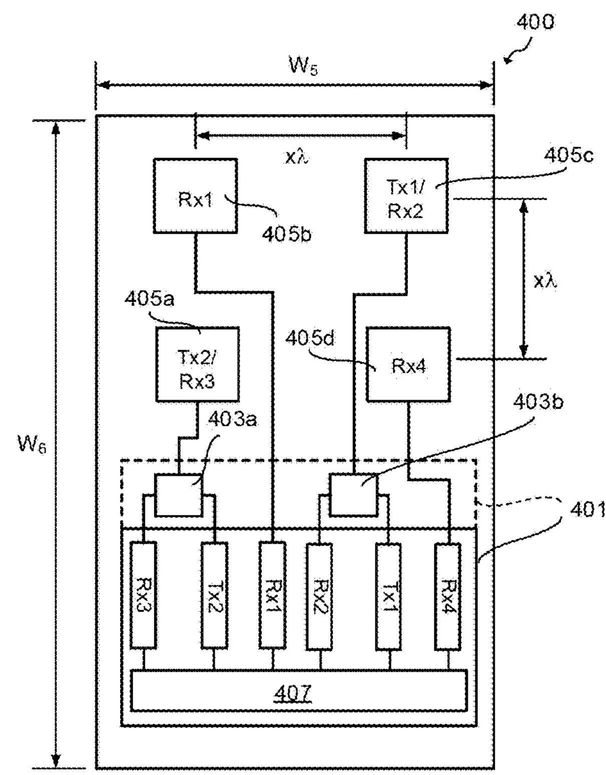
FIGS. 4A, 4B and 4C illustrate a schematic view of an RF circuit/antenna package in accordance with some embodiments.

FIG. 4A illustrates a schematic view of an RF circuitry/antenna package 400 in accordance with some embodiments. The RF circuitry/antenna package 400 includes an RF front-end IC die 401 having transmit circuits Tx1 and Tx2, and receive circuits Rx1, Rx2, Rx3 and Rx4. The RF circuitry/antenna package 400 further includes antennas 405*a*-405*d*. In some embodiments, the antennas 405*a*-405*d* may be similar to the receive antennas 109*a*-109*d* (see FIG. 1), and the description is not repeated herein for the sake of brevity. The antenna 405*a* is coupled to the receive circuit Rx3 and the transmit circuit Tx2 using a coupling structure 403*a*. The antenna 405*b* is coupled to the receive circuit Rx1. The antenna 405*c* is coupled to the receive circuit Rx2 and the transmit circuit Tx1 using a coupling structure 403*b*. The antenna 405*d* is coupled to the receive circuit Rx4. The coupling structures 403*a* and 403*b* may be implemented using a passive structure, such as a rat-race coupler, a Wilkinson power divider, a circulator, or the like, or a switch. In an embodiment, the coupling structures 403*a* and 403*b* may be formed on a substrate of the RF front-end IC die 401 of the RF circuitry/antenna package 400. In another embodiment, the coupling structures 403*a* and 403*b* may be formed in a redistribution layer in the fan-out area of the RF circuitry/antenna package 400. The RF front-end IC die 401 further includes a control circuit 407 coupled to the transmit circuits Tx1 and Tx2, and the receive circuits Rx1, Rx2, Rx3 and Rx4. The control circuit 407 is configured to activate or deactivate the transmit circuits Tx1 and Tx2, and the receive circuits Rx1, Rx2, Rx3 and Rx4. In an embodiment, the control circuit 407 includes one or more switches, for example. Alternatively, other suitable circuits may be used to implement the control circuit 407.

Referring further to FIG. 4A, the RF circuitry/antenna package 400 includes fewer antennas compared to the RF circuitry/antenna package 103 (see FIG. 1). In an embodiment, the RF circuitry/antenna package 400 does not include dedicated transmit antennas such as the transmit antennas 107*a* and 107*b* of the RF circuitry/antenna package 103. Accordingly, a first width $W_5$ of the RF circuitry/antenna package 400 may be less than the first width $W_1$ of the RF circuitry/antenna package 103. A difference between the first width $W_1$ and the first width $W_5$ may be between about 2 mm and about 4 mm, and a second width $W_6$ of the RF circuitry/antenna package 400 may be equal to the second width $W_2$ of the RF circuitry/antenna package 103. Alternatively, the second width $W_6$ of the RF circuitry/antenna package 400 may be different from the second width $W_2$ of the RF circuitry/antenna package 103.

Figure 4B:
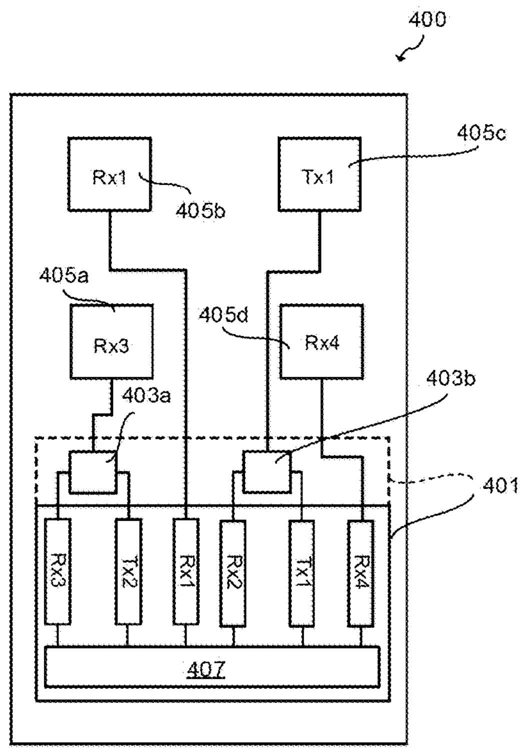

During operation of the RF circuitry/antenna package 400, the transmit circuits Tx1 and Tx2 are activated in an alternating manner, such that the transmit circuits Tx1 and Tx2 are not active at the same time. Referring to FIG. 4B, during a first mode of operation (also referred to as "Chirp 1"), the control circuit 407 activates the transmit circuit Tx1 and the receive circuit Rx3, while deactivates the receive circuit Rx2 and the transmit circuit Tx2. Accordingly, the antenna 405*c* acts as a transmit antenna and the antenna 405*a* acts as a receive antenna. Furthermore, the control circuit 407 also activates the receive circuits Rx1 and Rx4 and the antennas 405*b* and 405*d* act as receive antennas. In an embodiment, the antenna 405*c* transmits an RF signal toward an object (such as, for example, the gesturing hand 217 illustrated in FIG. 2, when the RF circuitry/antenna package 300 is used as a radar system for a gesture sensing system of a wearable device) and the antennas 405*a*, 405*b* and 405*d* receive a reflected RF signal from the object.

Figure 4C:
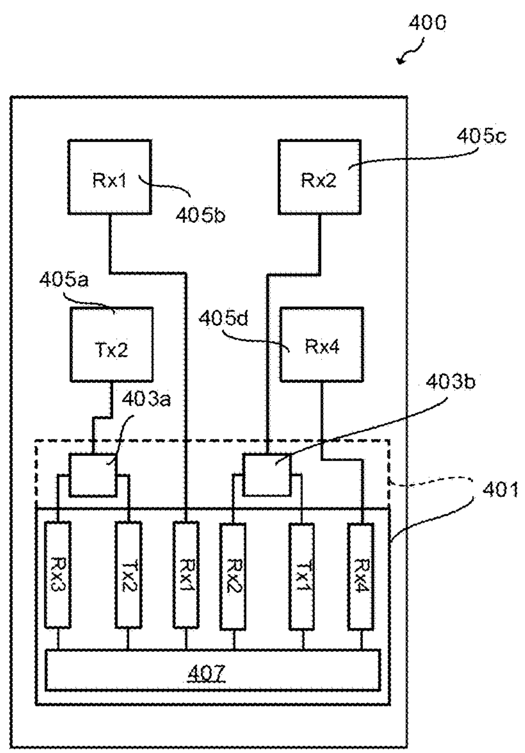

Referring to FIG. 4C, during a second mode of operation (also referred to as "Chirp 2"), the control circuit 407 activates the transmit circuit Tx2 and the receive circuit Rx2, while deactivates the receive circuit Rx3 and the transmit circuit Tx1. Accordingly, the antenna 405*c* acts as a receive antenna and the antenna 405*a* acts as a transmit antenna. Furthermore, the control circuit 407 also activates the receive circuits Rx1 and Rx4 and the antennas 405*b* and 405*d* act as receive antennas. In an embodiment, the antenna 405*a* transmits an RF signal toward the object and the antennas 405*b*, 405*c* and 405*d* receive a reflected RF signal from the object. In an embodiment, Chirp 1 and Chirp 2 are repeated N times in an alternating manner. The value of N may vary according to design requirements of the RF circuitry/antenna package 400.

Figure 5A:
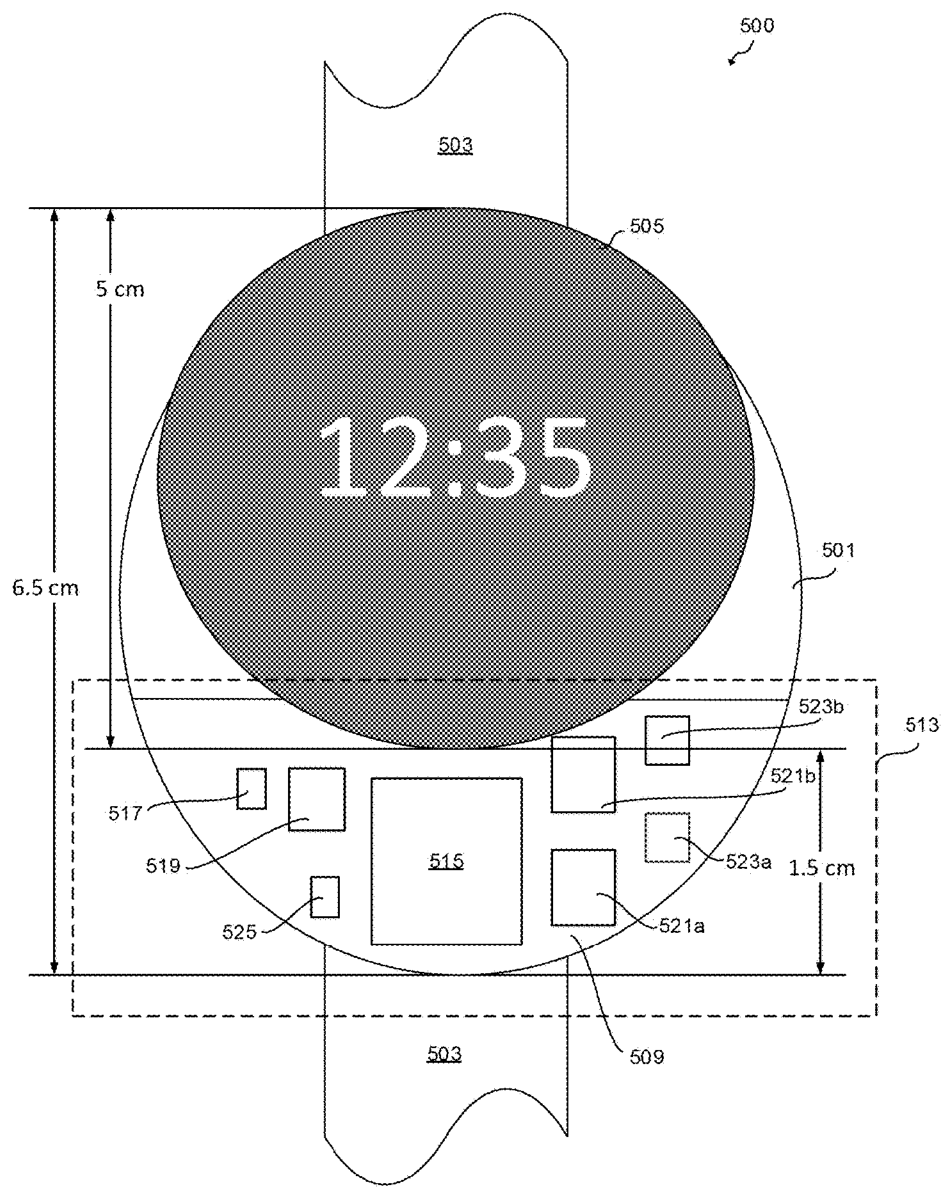
FIGS. 5A and 5B illustrate top and cross-sectional views of a wearable device in accordance with some embodiments.
Figure 5B:
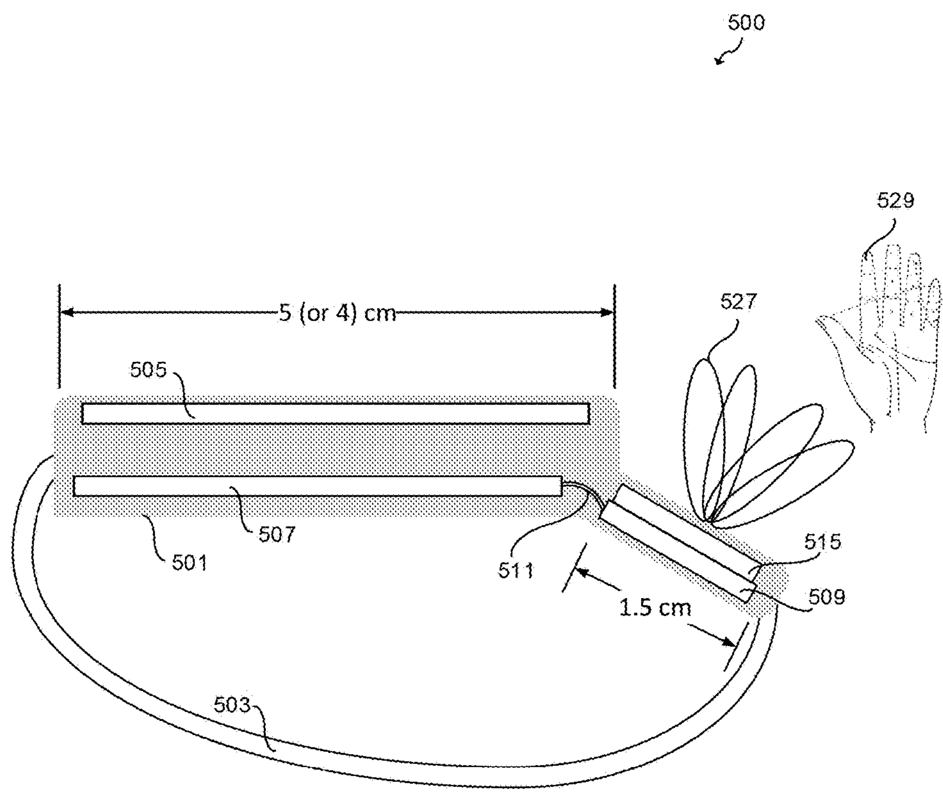

FIGS. 5A and 5B illustrate top and cross-sectional views of a wearable device 500 in accordance with some embodiments. In the illustrated embodiment, the wearable device 500 is a smart watch. Alternatively, the wearable device 500 may be a health monitoring system, an activity monitoring system, or like. The wearable device 500 includes a housing 501, which houses various components of the wearable device 500, acts as a mechanical support and provides protection to various components of the wearable device 500. The housing 501 may be formed using any suitable material providing desired support and protection to various components of the wearable device 500. For example, the housing 501 may be formed using a metal, a metal alloy, or the like. The wearable device 500 further includes a band 503 attached to the housing 501 and configured to attach the wearable device 500 to a wrist of a consumer, for example. The wearable device 500 further includes a display 505. The display 505 may be an LCD, an LED display, an AMOLED display, or the like.

The wearable device 500 further includes a first circuit board 507 placed directly below the display 505 and a second circuit board 509 placed at a junction of the housing 501 of the wearable device 500 with the band 503 of the wearable device 500, such that the second circuit board 509 forms an angle with the first circuit board 507. In an embodiment, the angle between the second circuit board 509 and the first circuit board 507 is between about 30 deg and about 60 deg. The second circuit board 509 is electrically coupled to the first circuit board 507 using a flexible connector 511, which allows for adjusting the angle between the second circuit board 509 and the first circuit board 507. The first circuit board 507 and the second circuit board 509 may be formed using similar materials and methods as the circuit board 101 described above with reference to FIG. 1, and the description is not repeated herein for the sake of brevity. As described below in greater detail, an RF system (such as, for example, the RF circuitry/antenna packages 300 and 400 illustrated in FIGS. 3A and 4A, respectively) and various electrical components are mounted on the second circuit board 509 to form a gesture sensing system (such as, for example, the mm-wave gesture sensing system 200 described above with reference to FIG. 2). By placing the gesture sensing system at the junction of the housing 501 of the wearable device 500 with the band 503 of the wearable device 500, RF signals transmitted from or received by the RF system of the gesture sensing system are not blocked by the display 505. In addition, a portion of the housing 501 disposed over the RF system of the gesture sensing system is formed of a material transparent for millimeter waves to ensure proper operation of the gesture sensing system.

Referring further to FIGS. 5A and 5B, a gesture sensing system 513 is mounted on the second circuit board 509 of the wearable device 500. For clarity of presentation, only components of the gesture sensing system 513 are illustrated. One of ordinary skill in the art will appreciate that the first circuit board 507 may include various components and devices depending on functional requirement of the wearable device 500. In some embodiments, the first circuit board 507 may include various application specific integrated circuits (ASICs), various components for powering and controlling the display 505 of the wearable device 500, various sensors such a motion sensor, a pressure sensor, a temperature sensor, a humidity sensor, a touch sensor, a heart rate sensor, or the like, various interface components such as USB, WiFi, WiGig, Bluetooth, or the like, various power management components, and a power source such as, for example, a battery.

In an embodiment, the gesture sensing system 513 includes an RF system 515. The RF system may be implemented using the RF circuitry/antenna package 300 (see FIG. 3A) or the RF circuitry/antenna package 400 (see FIG. 4A), and the description is not repeated herein for the sake of brevity. The gesture sensing system 513 further includes a crystal oscillator (Xtal) 517 and a phase locked loop (PLL) circuit 519, which are configured as a clock generation circuit that may be shared between various components of the gesture sensing system 513. The gesture sensing system 513 further includes baseband amplifiers 521_a_ and 521_b_ and analog-to-digital converters (ADCs) 523_a_ and 523_b_, which are configured to amplify and digitize output signals of the RF system 515. The gesture sensing system 513 further includes a switch 119 configured to couple the RF system 515 to a power management integrated circuit (PMIC) (not shown) of the wearable device 500. By using the RF circuitry/antenna packages 300 or 400 to implement the RF system 515, a total area of all components of the gesture sensing system 513 may be reduced. Accordingly, an area of the second circuit board 509 may also be reduced. In alternative embodiments, a footprint of the gesture sensing system 513 may be further reduced by integrating the baseband amplifiers 521_a_ and 521_b_ and/or the ADCs 523_a_ and 523_b_ in the RF system 515.

During operation of the gesture sensing system 513 of the wearable device 500, the RF system 515 generates a transmitted RF signal 527. Transmit antennas of the RF system 515 transmit the transmitted RF signal 527 to a gesturing hand 529. Receive antennas of the RF system 515 receive a reflected RF signal from the gesturing hand 529. The gesture sensing system 513 detects a gesture by comparing the transmitted RF signal and the reflected RF signal. The wearable device 500 performs an operation based on the detected gesture.

Figure 6:
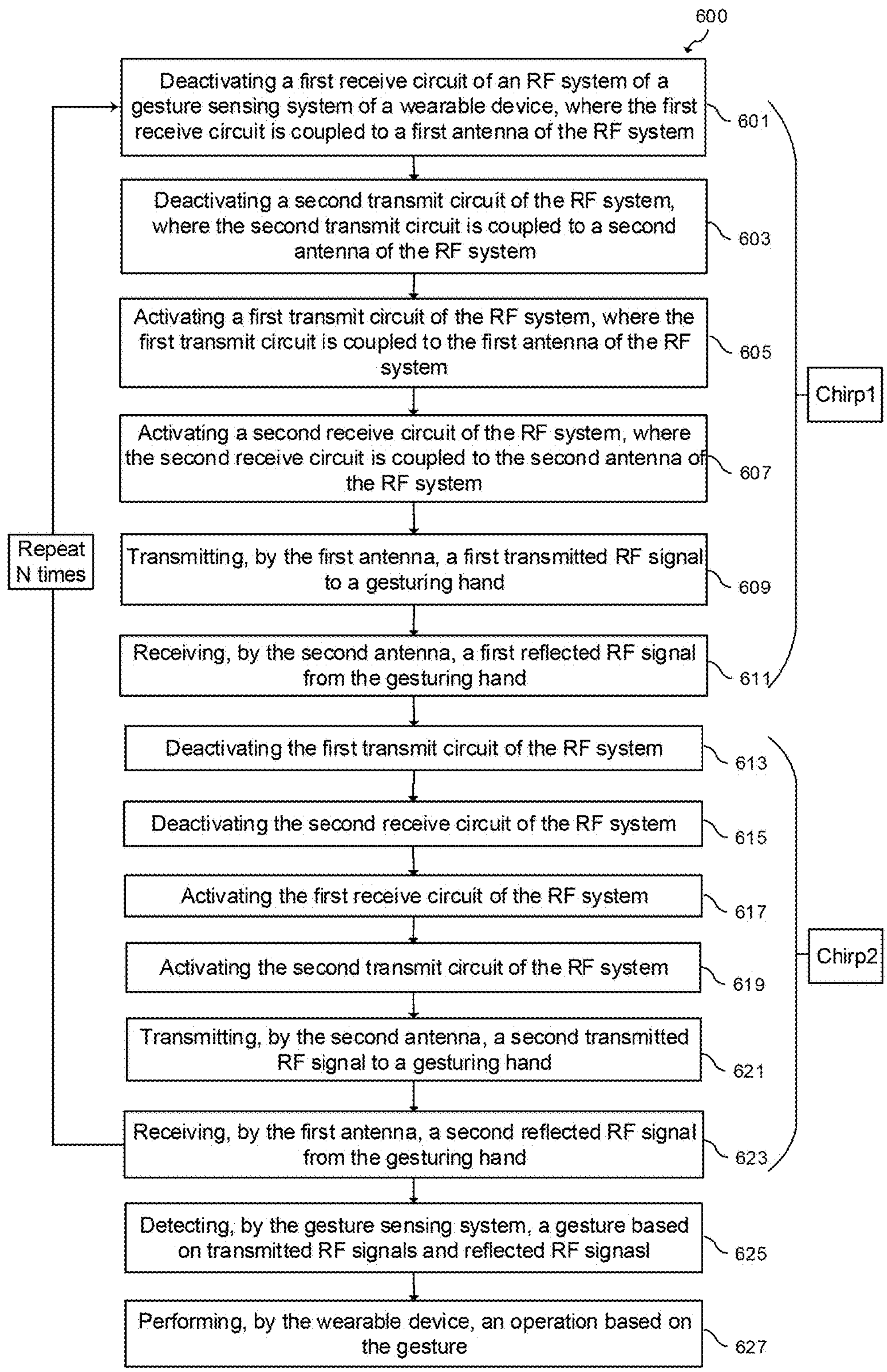
FIG. 6 illustrates a flow diagram of a method of operating a gesture sensing system integrated into a wearable device in accordance with some embodiments.

FIG. 6 illustrates a flow diagram of a method 600 of operating a gesture sensing system integrated into a wearable device in accordance with some embodiments. The method 600 starts with step 601, where a first receive circuit (such as, for example, the receive circuit Rx1 illustrated in FIGS. 3A-3C) of an RF system (such as, for example, the RF circuitry/antenna package 300 illustrated in FIG. 3A) of a gesture sensing system (such as, for example, the gesture sensing system 513 illustrated in FIGS. 5A and 5B) of a wearable device (such as, for example, the wearable device 500 illustrated in FIGS. 5A and 5B) is deactivated. In an embodiment, the first receive circuit is coupled to a first antenna (such as, for example, the antenna 305_b_ illustrated in FIGS. 3A-3C) using a first coupling structure (such as, for example, the coupling structure 303_a_ illustrated in FIGS. 3A-3C). In step 603, a second transmit circuit (such as, for example, the transmit circuit Tx2 illustrated in FIGS. 3A-3C) of the RF system is deactivated. In an embodiment, the second transmit circuit is coupled to a second antenna (such as, for example, the antenna 305_d_ illustrated in FIGS. 3A-3C) using a second coupling structure (such as, for example, the coupling structure 303_b_ illustrated in FIGS. 3A-3C). In step 605, a first transmit circuit (such as, for example, the transmit circuit Tx1 illustrated in FIGS. 3A-3C) of the RF system is activated. In an embodiment, the first transmit circuit is coupled to the first antenna using the first coupling structure. In step 607, a second receive circuit (such as, for example, the receive circuit Rx4 illustrated in FIGS. 3A-3C) of the RF system is activated. In an embodiment, the second receive circuit is coupled to the second antenna using the second coupling structure. In step 609, the first antenna transmits a first transmitted RF signal to a gesturing hand (such as, for example, the gesturing hand 529 illustrate in FIG. 5B). In step 611, the second antenna receives a first reflected RF signal from the gesturing hand. Steps 601-611 may also be collectively referred to as "Chirp 1."

Referring further to FIG. 6, in step 613, the first transmit circuit of the RF system is deactivated. In step 615, the second receive circuit of the RF system is deactivated. In step 617, the first receive circuit of the RF system is activated. In step 619, the second transmitted circuit of the RF system is activated. In step 621, the second antenna transmits a second transmitted RF signal to the gesturing hand. In step 623, the first antenna receives a second reflected RF signal from the gesturing hand. Steps 613-623 may also be collectively referred to as "Chirp 2." In an embodiment, Chirp 1 (steps 601-611) and Chirp 2 (613-623) are repeated one or more times in an alternating manner. In step 625, the gesture sensing system detects a gesture based on transmitted RF signals and reflected RF signals. In an embodiment, the gesture sensing system may compare the reflected RF signals to the transmitted RF signals to detect the gesture. In step 627, the wearable device performs an operation based on the gesture.

Embodiments of the present disclosure are summarized here. Other embodiments can also be understood form the entirety of the specification and the claims filed herein. One general aspect includes a radio frequency (RF) system including: an RF integrated circuit (IC) die, the RF IC die including: a first transmit circuit; a second transmit circuit; a first receive circuit; a second receive circuit; and a control circuit coupled to the first transmit circuit, the second transmit circuit, the first receive circuit, and the second receive circuit; a first antenna coupled to the first transmit circuit and the first receive circuit using a first coupling structure, where the control circuit is configured to activate the first transmit circuit and deactivate the first receive circuit during a first operation mode; and a second antenna coupled to the second transmit circuit and the second receive circuit using a second coupling structure, where the control circuit is configured to activate the second transmit circuit and deactivate the second receive circuit during a second operation mode.

Implementations may include one or more of the following features. The RF system where the control circuit is further configured to deactivate the second transmit circuit and activate the second receive circuit during the first operation mode. The RF system where the control circuit is configured to deactivate the first transmit circuit and activate the first receive circuit during the second operation mode. The RF system where, during the first operation mode, the first antenna is configured to transmit a first transmitted RF signal to an object and the second antenna is configured to receive a first reflected RF signal from the object. The RF system where, during the second operation mode, the second antenna is configured to transmit a second transmitted RF signal to the object and the first antenna is configured to receive a second reflected RF signal from the object. The RF system where the first coupling structure and the second coupling structure include passive structures. The RF system where the first coupling structure and the second coupling structure are disposed within the RF IC die. The RF system where the RF IC die, the first antenna and the second antenna are disposed in a package, and where the first coupling structure and the second coupling structure are disposed in a redistribution layer of the package. The RF system where the RF IC die further includes: a third receive circuit; and a fourth receive circuit. The RF system further including: a third antenna coupled to the third receive circuit; and a fourth antenna coupled to the fourth receive circuit. The RF system where centers of the first antenna, the second antenna, the third antenna, and the fourth antenna are disposed at corners of a square. The RF system where a first center of the first antenna is disposed at a first corner of the square and a second center of the second antenna is disposed at a second corner of the square, and where the first corner is opposite the second corner.

Another general aspect includes a radio frequency integrated circuit (RFIC) including: a plurality of transmit circuits and a plurality of receive circuits configured to be coupled to an antenna array; and a control circuit coupled to the plurality of transmit circuits and the plurality of receive circuits, where the control circuit is configured to activate a first subset of the plurality of transmit circuits and a first subset of the plurality of receive circuits during a first operation mode, and where the control circuit is configured to activate a second subset of the plurality of transmit circuits and a second subset of the plurality of receive circuits during a second operation mode, the first subset of the plurality of transmit circuits being different from the second subset of the plurality of transmit circuits.

Implementations may include one or more of the following features. The RFIC where the first subset of the plurality of receive circuits are different from the second subset of the plurality of receive circuits. The RFIC where the control circuit is further configured to deactivate a third subset of the plurality of transmit circuits and a third subset of the plurality of receive circuits during the first operation mode. The RFIC where the first subset of the plurality of transmit circuits and the third subset of the plurality of receive circuits are configured to be coupled to a same subset of the antenna array. The RFIC where the control circuit is further configured to deactivate a fourth subset of the plurality of transmit circuits and a fourth subset of the plurality of receive circuits during the second operation mode. The RFIC where the second subset of the plurality of transmit circuits and the fourth subset of the plurality of receive circuits are configured to be coupled to a same subset of the antenna array.

Another general aspect includes a method including: performing first mode operations, the first mode operations including: transmitting, by a first subset of an antenna array, a first transmitted RF signal to an object; and receiving, by a second subset of the antenna array, a first reflected RF signal from the object, where the first subset of the antenna array is different from the second subset of the antenna array; and performing second mode operations, the second mode operations including: transmitting, by a third subset of the antenna array, a second transmitted RF signal to the object; and receiving, by a fourth subset of the antenna array, a second reflected RF signal from the object, where the third subset of the antenna array is different from the fourth subset of the antenna array.

Implementations may include one or more of the following features. The method where the first subset of the antenna array is different from the third subset of the antenna array. The method where the second subset of the antenna array is different from the fourth subset of the antenna array. The method where the first mode operations further include: activating a first subset of transmit circuits coupled to the first subset of the antenna array; and deactivating a first subset of receive circuits coupled to the first subset of the antenna array; activating a second subset of receive circuits coupled to the second subset of the antenna array; and deactivating a second subset of transmit circuits coupled to the second subset of the antenna array. The method where a first transmit circuit of the first subset of transmit circuits and a first receive circuit of the first subset of receive circuits are coupled to a first antenna of the first subset of the antenna array using a first coupling structure. The method where a second transmit circuit of the second subset of transmit circuits and a second receive circuit of the second subset of receive circuits are coupled to a second antenna of the second subset of the antenna array using a second coupling structure, and where the second coupling structure is different from the first coupling structure. The method where the first coupling structure and the second coupling structure include switches. The method where the second mode operations further include: activating a first subset of transmit circuits coupled to the third subset of the antenna array; and deactivating a first subset of receive circuits coupled to the third subset of the antenna array; activating a second subset of receive circuits coupled to the fourth subset of the antenna array; and deactivating a second subset of transmit circuits coupled to the fourth subset of the antenna array. The method further including performing the first mode operations and the second mode operations one or more times in an alternating manner. The method where the object is a gesturing hand. The method further including detecting a gesture of the gesturing hand based on transmitted RF signals and reflected RF signals.

Various embodiments presented herein allow for forming an RF system having a plurality of antennas, such that a subset of antennas is configured to act as receive antennas or transmit antennas depending on a mode of operation of the RF system. By configuring the subset of antennas to act as receive antennas or transmit antennas, a total number of antennas of the RF system may be reduced. Accordingly, a size of the RF system may be reduced, which may be beneficial for integrating the RF system in devices that have reduced sizes, such as wearable devices, for example.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A radio frequency (RF) system comprising:
- an RF integrated circuit (IC) die, the RF IC die comprising:
  - a first transmit circuit;
  - a second transmit circuit;
  - a first receive circuit;
  - a second receive circuit;
  - a third receive circuit;
  - a fourth receive circuit; and
  - a control circuit coupled to the first transmit circuit, the second transmit circuit, the first receive circuit, and the second receive circuit;
- a first antenna coupled to the RF IC die, the first antenna being coupled to first transmit circuit and the first receive circuit using a first coupling structure, wherein the control circuit is configured to activate the first transmit circuit and deactivate the first receive circuit during a first operation mode;

a second antenna coupled to the RF IC die, the second antenna being coupled to second transmit circuit and the second receive circuit using a second coupling structure, wherein the control circuit is configured to activate the second transmit circuit and deactivate the second receive circuit during a second operation mode;

a third antenna coupled to the third receive circuit;

a fourth antenna coupled to the fourth receive circuit, wherein centers of the first antenna, the second antenna, the third antenna, and the fourth antenna are disposed at corners of a square; and a molding material layer over the first antenna and the second antenna, the molding material layer surrounding the RF IC die.

2. The RF system of claim 1, wherein the control circuit is further configured to deactivate the second transmit circuit and activate the second receive circuit during the first operation mode.

3. The RF system of claim 1, wherein the control circuit is configured to deactivate the first transmit circuit and activate the first receive circuit during the second operation mode.

4. The RF system of claim 1, wherein, during the first operation mode, the first antenna is configured to transmit a first transmitted RF signal to an object and the second antenna is configured to receive a first reflected RF signal from the object.

5. The RF system of claim 4, wherein, during the second operation mode, the second antenna is configured to transmit a second transmitted RF signal to the object and the first antenna is configured to receive a second reflected RF signal from the object.

6. The RF system of claim 1, wherein the first coupling structure and the second coupling structure comprise passive structures.

7. The RF system of claim 1, wherein the first coupling structure and the second coupling structure are disposed within the RF IC die.

8. The RF system of claim 1, wherein the RF IC die, the first antenna and the second antenna are disposed in a package, and wherein the first coupling structure and the second coupling structure are disposed in a redistribution layer of the package.

9. The RF system of claim 8, wherein the package has a first width between about 4 mm and about 7 mm and a second width between about 11 mm and about 12.5 mm.

10. The RF system of claim 1, wherein a first center of the first antenna is disposed at a first corner of the square and a second center of the second antenna is disposed at a second corner of the square, and wherein the first corner is opposite the second corner.

11. The RF system of claim 1, wherein the first coupling structure and the second coupling structure comprise switches.

12. The RF system of claim 1, wherein the control circuit is further coupled to the third receive circuit and the fourth receive circuit.

13. A radio frequency integrated circuit (RFIC) comprising:

a plurality of transmit circuits and a plurality of receive circuits configured to be coupled to an antenna array; and a control circuit coupled to the plurality of transmit circuits and the plurality of receive circuits, wherein the control circuit is configured to activate a first subset of the plurality of transmit circuits and a first subset of the plurality of receive circuits during a first operation mode, a first receive circuit of the first subset of the plurality of receive circuits being configured to be coupled to a first antenna of the antenna array, a number of transmit circuits in the first subset of the plurality of transmit circuits being different from a number of receive circuits in the first subset of the plurality of receive circuits, and wherein the control circuit is configured to activate a second subset of the plurality of transmit circuits and a second subset of the plurality of receive circuits during a second operation mode, a second receive circuit of the second subset of the plurality of receive circuits being configured to be coupled to a second antenna of the antenna array, the first antenna and the second antenna being disposed at opposite corners of a square, the first subset of the plurality of transmit circuits being different from the second subset of the plurality of transmit circuits.

14. The RFIC of claim 13, wherein the first subset of the plurality of receive circuits are different from the second subset of the plurality of receive circuits.

15. The RFIC of claim 13, wherein the control circuit is further configured to deactivate a third subset of the plurality of transmit circuits and a third subset of the plurality of receive circuits during the first operation mode.

16. The RFIC of claim 15, wherein the first subset of the plurality of transmit circuits and the third subset of the plurality of receive circuits are configured to be coupled to a same subset of the antenna array.

17. The RFIC of claim 15, wherein the control circuit is further configured to deactivate a fourth subset of the plurality of transmit circuits and a fourth subset of the plurality of receive circuits during the second operation mode.

18. The RFIC of claim 17, wherein the second subset of the plurality of transmit circuits and the fourth subset of the plurality of receive circuits are configured to be coupled to a same subset of the antenna array.

19. A method comprising:

performing first mode operations, the first mode operations comprising:

transmitting, by a first subset of an antenna array, a first transmitted RF signal to an object; and receiving, by a second subset of the antenna array, a first reflected RF signal from the object, wherein the first subset of the antenna array is different from the second subset of the antenna array; and performing second mode operations, the second mode operations comprising:

transmitting, by a third subset of the antenna array, a second transmitted RF signal to the object; and receiving, by a fourth subset of the antenna array, a second reflected RF signal from the object, wherein the third subset of the antenna array is different from the fourth subset of the antenna array, wherein a first antenna of the first subset of the antenna array and a second antenna of third subset of the antenna array are disposed at opposite corners of a square, and wherein at least one antenna of the antenna array belongs to the first subset of the antenna array and the fourth subset of the antenna array.

20. The method of claim 19, wherein the first subset of the antenna array is different from the third subset of the antenna array.

21. The method of claim 19, wherein the second subset of the antenna array is different from the fourth subset of the antenna array.

22. The method of claim 19, wherein the first mode operations further comprise:
activating a first subset of transmit circuits coupled to the first subset of the antenna array; and
deactivating a first subset of receive circuits coupled to the first subset of the antenna array;
activating a second subset of receive circuits coupled to the second subset of the antenna array; and
deactivating a second subset of transmit circuits coupled to the second subset of the antenna array.

23. The method of claim 22, wherein a first transmit circuit of the first subset of transmit circuits and a first receive circuit of the first subset of receive circuits are coupled to a first antenna of the first subset of the antenna array using a first coupling structure.

24. The method of claim 23, wherein a second transmit circuit of the second subset of transmit circuits and a second receive circuit of the second subset of receive circuits are coupled to a second antenna of the second subset of the antenna array using a second coupling structure, and wherein the second coupling structure is different from the first coupling structure.

25. The method of claim 24, wherein the first coupling structure and the second coupling structure comprise switches.

26. The method of claim 19, wherein the second mode operations further comprise:
activating a first subset of transmit circuits coupled to the third subset of the antenna array; and
deactivating a first subset of receive circuits coupled to the third subset of the antenna array;
activating a second subset of receive circuits coupled to the fourth subset of the antenna array; and
deactivating a second subset of transmit circuits coupled to the fourth subset of the antenna array.

27. The method of claim 19, further comprising performing the first mode operations and the second mode operations one or more times in an alternating manner.

28. The method of claim 19, wherein the object is a gesturing hand.

29. The method of claim 28, further comprising detecting a gesture of the gesturing hand based on transmitted RF signals and reflected RF signals.

* * * * *